United States Patent
Lees et al.

(10) Patent No.: US 7,172,380 B2
(45) Date of Patent: Feb. 6, 2007

(54) WHEEL NUT ASSEMBLY

(75) Inventors: John Sydney Lees, Great Wyrley (GB); David Daniel George Vile, Fringford (GB)

(73) Assignee: Wheelsure Technologies Limited (GB)

( * ) Notice: Subject to any disclaimer, the term of this patent is extended or adjusted under 35 U.S.C. 154(b) by 16 days.

(21) Appl. No.: 10/398,982

(22) PCT Filed: Oct. 4, 2001

(86) PCT No.: PCT/GB01/04431

§ 371 (c)(1),
(2), (4) Date: Aug. 25, 2003

(87) PCT Pub. No.: WO02/29263

PCT Pub. Date: Apr. 11, 2002

(65) Prior Publication Data

US 2005/0260059 A1  Nov. 24, 2005

(51) Int. Cl.
*F16B 37/14* (2006.01)

(52) U.S. Cl. .................... 411/372.5; 411/244; 411/235; 411/222; 411/120

(58) Field of Classification Search ............... 411/910, 411/429–432, 438, 369–370, 372.5, 372.6, 411/373, 412, 413, 244, 235, 222, 119, 120
See application file for complete search history.

(56) References Cited

U.S. PATENT DOCUMENTS

| | | | | |
|---|---|---|---|---|
| 480,667 A | * | 8/1892 | Miller | ......................... 411/236 |
| 721,990 A | * | 3/1903 | Young et al. | ................ 411/327 |
| 739,716 A | * | 9/1903 | Reid | ........................... 411/236 |
| 867,552 A | * | 10/1907 | Bradford et al. | .............. 301/87 |
| 972,140 A | * | 10/1910 | Adam | ......................... 411/429 |
| 1,254,514 A | * | 1/1918 | Lehmann | ..................... 411/429 |
| 1,324,867 A | * | 12/1919 | Wilson | ........................ 411/428 |
| 1,374,015 A | * | 4/1921 | Jerruss et al. | ................ 411/237 |

(Continued)

FOREIGN PATENT DOCUMENTS

DE           593758      *  2/1934

(Continued)

*Primary Examiner*—Katherine Mitchell
*Assistant Examiner*—Jeffrey A. Sharp
(74) *Attorney, Agent, or Firm*—Keusey, Tutunjian & Bitetto, P.C.

(57) ABSTRACT

A wheel nut assembly includes a stud (1), a main wheel nut (4) mountable on threads (3) provided on the stud, and a retaining nut (6) engageable with threads (5) provided on the stud to prevent accidental loosening of the wheel nut (4). The threads of the wheel nut (4) and the threads for the retaining nut (6) are of opposite hand. A cap (11) is slidably mounted on the retaining nut (6) and biased into a first position by a spring (16). The cap (11) includes multi-hexagonal profiles (12, 14) for engaging hexagonal profiles (13, 15) provided on the retaining nut (6) and on the main wheel nut (4). Accordingly, in the first position, the retaining nut (6) and the main wheel nut (4) are rotationally locked to each other and because of the opposite hand of the respective threads it is not possible to remove the retaining nut. To release the retaining nut (6), the cap (11) is grasped and pulled to the limit permitted by the spring (16) to permit rotation of the retaining nut (6) and removal thereof.

11 Claims, 1 Drawing Sheet

U.S. PATENT DOCUMENTS

| | | | | | |
|---|---|---|---|---|---|
| 1,413,024 | A | * | 4/1922 | Harrell | 411/243 |
| 1,497,859 | A | * | 6/1924 | Lilly | 411/533 |
| 1,651,187 | A | * | 11/1927 | Elwyn | 411/204 |
| 1,656,118 | A | * | 1/1928 | Joyal | 411/227 |
| 2,313,763 | A | * | 3/1943 | Olsen | 411/223 |
| 2,336,164 | A | * | 12/1943 | Chaskin | 411/243 |
| 2,391,232 | A | * | 12/1945 | Farrell et al. | 411/244 |
| 2,456,234 | A | * | 12/1948 | Young | 285/94 |
| 2,648,367 | A | * | 8/1953 | Curran | 411/235 |
| 2,724,297 | A | * | 11/1955 | Mercer | 269/258 |
| 2,728,895 | A | * | 12/1955 | Edward et al. | 439/321 |
| 2,737,222 | A | * | 3/1956 | Becker | 411/105 |
| 2,766,799 | A | * | 10/1956 | Poupitch | 411/134 |
| 2,966,187 | A | * | 12/1960 | Cock | 411/330 |
| 3,077,913 | A | * | 2/1963 | Bryson | 411/119 |
| 3,670,795 | A | * | 6/1972 | Kupfrian | 411/195 |
| 3,734,444 | A | * | 5/1973 | Thorngate | 248/503 |
| 3,784,316 | A | * | 1/1974 | Bittern | 408/204 |
| 3,851,690 | A | * | 12/1974 | Wing et al. | 411/190 |
| 3,877,672 | A | * | 4/1975 | Wright | 248/503 |
| 3,960,047 | A | * | 6/1976 | Liffick | 411/429 |
| 4,018,132 | A | * | 4/1977 | Abe | 411/413 |
| 4,324,516 | A | * | 4/1982 | Sain et al. | 411/5 |
| 4,336,698 | A | * | 6/1982 | Hurd | 70/231 |
| 4,400,123 | A | * | 8/1983 | Dunegan | 411/373 |
| 4,530,530 | A | * | 7/1985 | Schaefer | 282/256.75 |
| 4,690,167 | A | * | 9/1987 | Skipper | 137/382 |
| 4,737,059 | A | * | 4/1988 | Batten | 411/437 |
| 4,764,070 | A | * | 8/1988 | Baltzell et al. | 411/430 |
| 4,784,555 | A | * | 11/1988 | Cantrell | 411/431 |
| 4,813,835 | A | * | 3/1989 | Toth | 411/429 |
| 4,824,305 | A | * | 4/1989 | McCauley | 411/431 |
| 4,836,727 | A | * | 6/1989 | Volkmann | 411/4 |
| 4,875,266 | A | * | 10/1989 | Batten | 29/263 |
| 4,875,819 | A | * | 10/1989 | Wilkinson | 411/432 |
| 4,884,933 | A | * | 12/1989 | Preusker et al. | 411/177 |
| 4,897,008 | A | * | 1/1990 | Parks | 411/432 |
| 4,930,961 | A | * | 6/1990 | Weis | 411/266 |
| 4,968,202 | A | * | 11/1990 | Lanham | 411/431 |
| 4,969,788 | A | * | 11/1990 | Goiny | 411/428 |
| 4,971,501 | A | * | 11/1990 | Chavez | 411/221 |
| 5,028,093 | A | * | 7/1991 | Nason | 301/37.374 |
| 5,042,880 | A | * | 8/1991 | Garuti et al. | 301/35.624 |
| 5,048,898 | A | * | 9/1991 | Russell | 301/37.375 |
| 5,082,409 | A | * | 1/1992 | Bias | 411/431 |
| 5,112,176 | A | * | 5/1992 | McCauley et al. | 411/432 |
| 5,120,174 | A | * | 6/1992 | Patti | 411/431 |
| 5,137,408 | A | * | 8/1992 | Junkers | 411/432 |
| 5,163,797 | A | * | 11/1992 | Patti | 411/431 |
| 5,209,623 | A | * | 5/1993 | Krehnovi | 411/432 |
| 5,219,255 | A | * | 6/1993 | Hussain et al. | 411/432 |
| 5,302,069 | A | * | 4/1994 | Toth et al. | 411/429 |
| 5,350,266 | A | * | 9/1994 | Espey et al. | 411/431 |
| 5,358,367 | A | * | 10/1994 | Yang | 411/397 |
| 5,360,304 | A | * | 11/1994 | Notaro et al. | 411/432 |
| 5,380,070 | A | * | 1/1995 | FitzGerald | 301/37.374 |
| 5,391,032 | A | * | 2/1995 | Vassalotti | 411/214 |
| 5,536,127 | A | * | 7/1996 | Pennig | 411/413 |
| 5,544,991 | A | * | 8/1996 | Richardson | 411/237 |
| 5,611,654 | A | * | 3/1997 | Frattarola et al. | 411/432 |
| 5,627,610 | A | * | 5/1997 | Marui et al. | 351/141 |
| 5,630,687 | A | * | 5/1997 | Robinson | 411/372.6 |
| 5,653,481 | A | * | 8/1997 | Alderman | 285/363 |
| 5,700,122 | A | * | 12/1997 | Korpi | 411/551 |
| 5,752,795 | A | * | 5/1998 | D'Adamo | 411/429 |
| 5,772,377 | A | * | 6/1998 | Bydalek | 411/429 |
| 5,800,108 | A | * | 9/1998 | Cabahug | 411/433 |
| 5,803,690 | A | * | 9/1998 | Savinsky | 411/432 |
| 5,810,532 | A | * | 9/1998 | Huang | 411/431 |
| 5,842,749 | A | * | 12/1998 | DiMarco | 301/37.375 |
| 5,855,463 | A | * | 1/1999 | Newby | 411/244 |
| 6,036,420 | A | * | 3/2000 | Somers et al. | 411/430 |
| 6,039,408 | A | * | 3/2000 | Alvarez | 301/35.623 |
| 6,053,683 | A | * | 4/2000 | Cabiran | 411/372.6 |
| 6,062,787 | A | * | 5/2000 | Maddalena | 411/429 |
| 6,102,488 | A | * | 8/2000 | Wilson | 301/35.623 |
| 6,125,526 | A | * | 10/2000 | Wierzchon | 29/525.02 |
| 6,135,691 | A | * | 10/2000 | Nadarajah et al. | 411/431 |
| 6,139,113 | A | * | 10/2000 | Seliga | 301/35.624 |
| 6,142,579 | A | * | 11/2000 | Thiel | 301/37.374 |
| 6,146,070 | A | * | 11/2000 | Koma | 411/5 |
| 6,318,942 | B1 | * | 11/2001 | Wieczorek | 411/431 |
| 6,390,506 | B1 | * | 5/2002 | Michalski et al. | 280/779 |
| 6,435,791 | B1 | * | 8/2002 | Bydalek | 411/428 |
| 6,439,816 | B1 | * | 8/2002 | Nance et al. | 411/108 |
| 6,592,314 | B1 | * | 7/2003 | Wilson | 411/429 |
| 6,695,557 | B2 | * | 2/2004 | Hove et al. | 411/429 |
| 2003/0068212 | A1 | * | 4/2003 | Wilson | 411/429 |
| 2003/0202859 | A1 | * | 10/2003 | Van Ingen et al. | 411/429 |
| 2004/0126202 | A1 | * | 7/2004 | Somers et al. | 411/429 |
| 2005/0025607 | A1 | * | 2/2005 | Guantonio | 411/222 |
| 2005/0105986 | A1 | * | 5/2005 | Woolstencroft | 411/372.5 |

FOREIGN PATENT DOCUMENTS

| | | | |
|---|---|---|---|
| DE | 86 11 819 | | 9/1986 |
| FR | 2 676 876 | | 3/1999 |
| WO | WO 98/32617 | * | 7/1998 |
| WO | WO 9832617 A1 | * | 7/1998 |

* cited by examiner

WHEEL NUT ASSEMBLY

FIELD OF THE INVENTION

This invention relates to improvements in wheel nut assemblies for retaining a wheel onto a hub and in particular relates to fixings for vehicle wheels.

DESCRIPTION OF RELATED ART

It is known to fix a wheel onto a vehicle hub using a plurality of wheel studs, which are fixed to the hub, and a plurality of wheel nuts with one nut provided for each stud. The studs have an external threaded portion which is adapted to co-operate with a corresponding internal threaded portion of the wheel nut. Such a wheel nut assembly will hereafter be referred to as being of the kind set forth.

Whilst wheel nut assemblies of the kind set forth are widely used to mount wheels on vehicles, there is a serious problem with the nuts working loose. In a worst case, if all the nuts work loose, the wheel can release itself from the hub with potentially catastrophic results.

SUMMARY OF THE INVENTION

In our earlier United Kingdom patent application GB 2335721 there is disclosed an improved wheel nut assembly in which a second thread is provided on the wheel stud having opposite hand to the first thread. A retaining nut is threaded down onto the second thread, and a locking cap is placed over the retaining nut and wheel nut to prevent relative rotation.

It is an object of the present invention to provide improvements in wheel stud assemblies of the kind set forth, and improvements to the modified assembly of our earlier British patent application.

In accordance with a first aspect, the invention provides a wheel nut assembly comprising: a wheel stud having a first portion having a first external thread which is adapted to co-operate with an internal thread provided on a wheel nut, and a second portion having a second thread, of the opposite hand to the first external thread, which co-operates with a retaining member having a thread which is of the same hand as the second thread; a locking member which substantially prevents relative movement between the retaining member and the wheel nut, characterized in that the retaining member is held captive by the locking member when the retaining member is unthreaded from the wheel stud.

By providing for the locking member to hold captive the retaining member when free, the retaining member cannot be lost independently from the locking member. Installation and removal is also made simpler, especially when the operator is wearing gloves. Also, when the retaining member is in its use position, the locking member will be retained against accidental loss.

The locking member may comprise an open-ended cap with the retaining member comprising a nut or bolt held captive at least partially within the cap. Conveniently, the retaining member comprises a nut, which co-operates with an external threaded portion of the wheel stud. The nut may be wholly retained within the cap when the nut is free of the wheel stud.

The nut may be retained within the cap by a spring means, which resiliently biases the nut into the cap. The nut may be permitted to slide within the cap against the force provided by the spring means. The spring means may comprise a coil spring, and it may co-operate with an internal groove in the cap.

The retaining member may be movable relative to the locking member between a first position in which it can be tightened to the second thread with the locking member free of the wheel nut and a second position in which the locking member cooperates with both the retaining member and the wheel nut to prevent relative rotation.

In one convenient arrangement, an opening in the otherwise closed end of the cap receives part of the retaining member, and the cap is permanently rotational fast with the retaining member.

To install, the retaining member is engaged with the second thread by rotating the cap. Once the nut starts to engage the thread, the cap can be pulled axially away from the stud whilst turning the cap and nut until the nut is fully tightened. The cap can then be released whereby it moves under the influence of the spring to its at rest (second) position in which an internal profile in the cap engages the wheel nut to prevent rotation of the cap relative to the wheel nut.

To remove the retaining member the cap is pulled away from the wheel stud to disengage the internal profile of the cap from the wheel nut. The cap and retaining member can then be turned to unscrew the retaining nut which, on complete release, is automatically retracted into the cap by the spring means.

BRIEF DESCRIPTION OF THE DRAWINGS

There will now be described, by way of example only, one embodiment of the present invention with reference to the accompanying drawings of which.

DETAILED DESCRIPTION OF PREFERRED EMBODIMENTS

Figure 1:
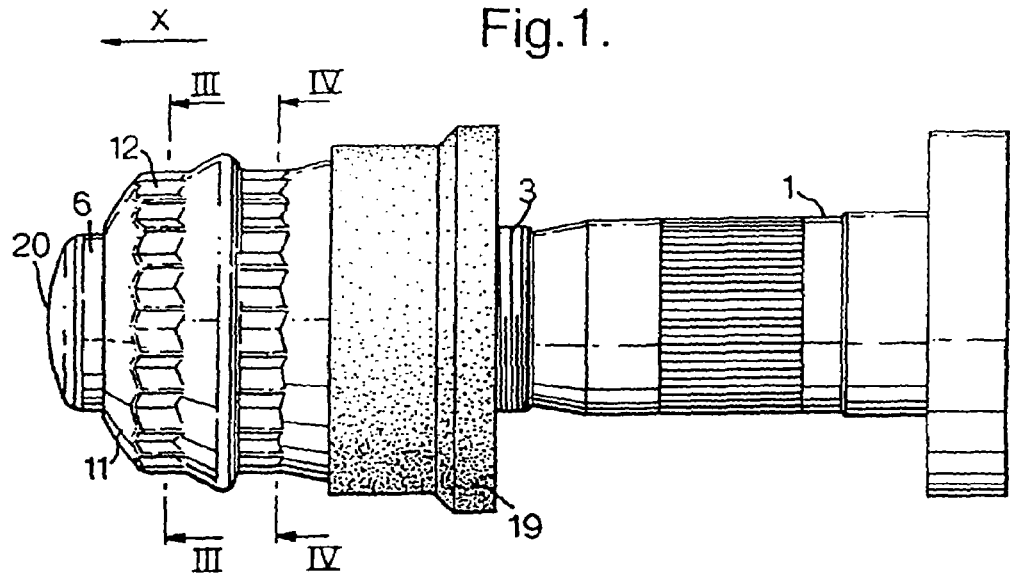
FIG. 1 is a side view of a preferred embodiment of the present invention.
Figure 2:
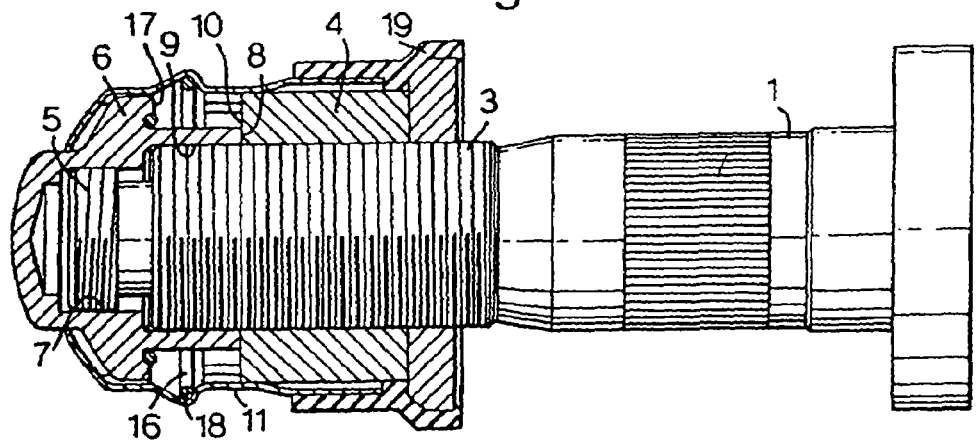
FIG. 2 is a longitudinal cross-section of the embodiment of FIG. 1.
Figure 3:
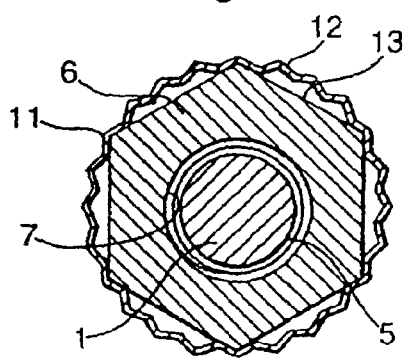
FIG. 3 is a cross-section along line III—III of FIG. 1.
Figure 4:
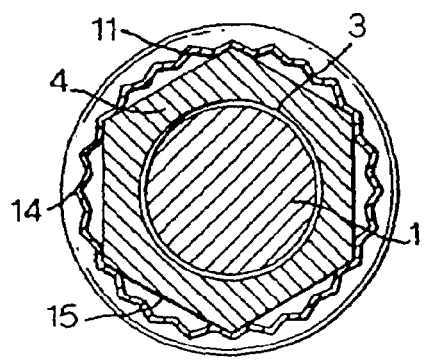
FIG. 4 is a cross-section along the line IV—IV of FIG. 1.

The wheel nut assembly comprises a stud 1 which is attached at its lower end to a hub (not shown). The stud can be welded in place. The stud has a first external thread 3 provided over at least a lower portion proximal to the hub. A wheel nut 4 is adopted to threadedly engage with the stud 1 by means of an internal thread, which cooperates with the external thread 3 on the stud 1. The wheel nut 4 may be tightened to the required torque and acts to trap a part of the vehicle wheel (not shown) onto the wheel hub.

The stud 1 is of a greater axial length than is needed to accommodate the wheel nut 4 so that when the nut is correctly tightened onto the stud, an end portion of the stud 1 protrudes from the wheel nut 4.

An external thread 5 is provided on the end of the stud, which has a smaller external diameter than the internal diameter of the wheel nut 4. This second thread 5 is of opposite hand to the first thread 3. A retaining nut 6 which, in the preferred embodiment, is in the form of a cap nut, is provided which includes an internal threaded region 7 which engages with the second thread 5. Between the threaded region 7 and the end surface 8 of the retaining nut the retaining nut has a smooth cylindrical portion 9 which is sized to be a clearance fit over the threads 3 of the stud 1.

Accordingly, once the wheel nut 4 has been tightened to the required extent the retaining nut may be threaded onto the external thread 5 until the end surface 8 of the retaining member engages the end surface 10 of the nut 4. It will be appreciated that when the retaining nut 6 is screwed down in this manner it will prevent removal of the main wheel nut 4, unless the retaining nut 6 is first removed. By making the external threads 3 associated with the wheel nut 4 and the threads 5 associated with the retaining nut 6 of opposite hand, the direction of rotation necessary to remove the retaining nut 6 is the direction of rotation which will tend to tighten the wheel nut 4. Accordingly, by making the retaining nut 6 rotationally fast with the wheel nut 4 removal of the retaining nut is prevented hence slackening of the wheel nut is prevented.

During normal use, the retaining nut 6 is held rotationally fast with the wheel nut 4 by means of a cap 11. The cap 11 is slidably mounted on the retaining nut 6 so that it is, to a limited extent, axially movable relative to the retaining nut 6. The cap 11 includes a multi-hexagonal profile 12 which is in engagement with a hexagonal profile 13 provided on the retaining nut 6 so that the cap 11 is rotationally fast with the retaining nut, at least when the components are in the use configuration illustrated in the drawings. Similarly, the cap includes a second multi-hexagonal profile 14 which, when the components are in the rest configuration illustrated in the drawing, is engaged within the hexagonal profile 15 of the wheel nut 4 to prevent rotation between the cap 111 and the wheel nut 4. Hence, when the components are in their relaxed configuration illustrated in the drawings the retaining nut 6 is rotationally fast with the wheel nut 4, and accordingly removal of the retaining nut 6 (and of course removal of the wheel nut 4) is prevented.

A coil spring 16 is located with one end received under the shoulder provided on the retaining nut 6 and the other end received within a groove 18 provided in the cap 11. The coil spring maintains the cap 11 in the position illustrated in the drawings, but permits axial movement of the cap if the cap is manually grasped and pulled in the direction of the arrow X. The spring 16 prevents complete removal of the cap 11 from the retaining nut, but permits the cap to move axially sufficiently far to disengage the multi-hexagonal profile 14 from the wheel nut 4 and/or to permit the disengagement of the multi-hexagonal profile 12 from the hexagonal profile 13 of the retaining nut 6.

A seal 18 formed of suitable elastomeric material, for example a rubber, is provided to prevent ingress of dirt between the cap 11 and the wheel nut 4. The seal does not prevent axial movement of the cap 11 and accordingly does not impede operation of the wheel nut assembly as described above.

In use, the components will normally occupy the configuration shown in the drawing and will be effective to lock the wheel nuts 4 against accidental release. When it is desired to release a wheel nut an operative will grasp the cap 11 and pull it in the direction of the arrow X to the length of travel permitted by the spring 16, thereby disengaging the multi-hexagonal profile 14 from the wheel nut 4. The cap 11 may then be rotated and, by virtue of the engagement to the multi-hexagonal profile 12 with the hexagonal profile 13 of the retaining nut, the retaining nut 6 itself will be rotated. By this means, the retaining nut 6 can be removed and the wheel nut 4 can then be removed in conventional manner. To re-apply the retaining nut 6, the wheel nut 4 is first tightened to the required torque and then the retaining nut is offered up to the external thread 5 and rotated to start the internal thread 7 of the retaining nut on the external thread 5. If necessary, the end 20 of the retaining nut may be depressed relative to the cap 11 in order to assist engagement of the internal threads 7 of the retaining nut 6 with the exterior thread 5 of the stud.

Once the internal thread 7 of the retaining nut 6 has been started on the exterior thread 5 the operative will grasp the cap 11 and pull it axially away from the wheel nut to the limit of travel permitted by the spring 16. With the cap so pulled, the retaining nut 6 can be screwed fully home until the end surface 8 of the retaining nut engages the end surface 10 of the wheel nut 4. The cap may then be released and under the influence of the spring 16 will return to the configuration illustrated in the drawings. Sufficient clearance is provided between the multi-hexagonal profile 14 and the wheel nut 4 to ensure that the cap 11 is able to assume its use position as illustrated in the drawings, regardless of the relative rotational positions of the hexagonal profiles 13, 15 of the retaining nut 6 and wheel nut 4.

The invention claimed is:

1. A wheel nut assembly comprising:
    a wheel stud having:
        a first portion having a first external thread which is adapted to co-operate with an internal thread provided on a wheel nut, and
        a second portion having a second thread of opposite hand to the first external thread, which co-operates with a retaining member having a thread which is of the same hand as the second thread;
    a locking member configured to substantially prevent relative movement between the retaining member and the wheel nut, the locking member comprising a cap which is slidably mounted onto the retaining member and the wheel nut, the locking member being configured to captively retain the retaining member such that the retaining member remains axially displaceable relative to all portions of the locking member; and
    a spring means configured to apply forces to the retaining member in an axial direction so as to bias the retaining member away from an open end of the locking member, the spring means being elastically deformable to permit axial bodily movement of the locking member relative to both the retaining member and the wheel nut, to disengage the locking member from the wheel nut to permit removal of the locking member and retaining member as a unit from the wheel stud.

2. The wheel nut assembly of claim 1 wherein the cap is open ended and the retaining member comprises a nut held captive at least partially within the cap.

3. The wheel nut assembly of claim 1, wherein the spring means resiliently biases the retaining member into the cap, and permits limited axial movement of the retaining member relative to the cap.

4. The wheel nut assembly of claim 1, wherein the spring means comprises a coil spring.

5. The wheel nut assembly of claim 1 wherein the retaining member has an hexagonal external profile and the locking member includes a portion with a profile for engaging the hexagonal profile of the retaining member.

6. The wheel nut assembly of claim 5 wherein the locking member includes a portion with a multi-hexagonal profile for engaging the hexagonal profile of the retaining member.

7. The wheel nut assembly of claim 1 wherein the wheel nut has an hexagonal external profile and the locking member includes a portion with a multi-hexagonal profile for engaging the hexagonal profile of the wheel nut.

8. The wheel nut assembly of claim 1 wherein the retaining member is in the form of a cap nut.

9. The wheel nut assembly of claim 1 including a seal means of elastomeric material located between the locking member and the wheel nut to prevent any ingress of dirt and moisture between the locking member and the wheel nut.

10. The wheel nut assembly of claim 1, wherein the cap has an open end and a partially closed end with an opening, and the retaining member is a nut held captive at least partially within the locking member, said opening being sized to allow a portion of the retaining member to pass axially through said partially closed end.

11. A wheel nut assembly comprising:
   a wheel stud having:
      a first portion having a first external thread which is adapted to co-operate with an internal thread provided on a wheel nut, and
      a second portion having a second thread of opposite hand to the first external thread, which co-operates with a retaining member having a thread which is of the same hand as the second thread;
   a locking member configured to substantially prevent relative movement between the retaining member and the wheel nut, the locking member comprising a cap which is slidably mounted onto the retaining member and the wheel nut, the locking member being configured to captively retain the retaining member such that the retaining member remains axially displaceable relative to all portions of the locking member; and
   a spring means configured to apply a force to the retaining member in an axial direction so as to bias the retaining member away from an open end of the locking member, the spring means for engaging the locking member with the retaining member in a first position, and for engaging the locking member with the retaining member and the wheel nut in a second position.

\* \* \* \* \*